US011010925B2

(12) United States Patent
    Torma (10) Patent No.: US 11,010,925 B2
(45) Date of Patent: May 18, 2021

(54) METHODS AND COMPUTER PROGRAM PRODUCTS FOR CALIBRATING STEREO IMAGING SYSTEMS BY USING A PLANAR MIRROR

(71) Applicant: LATERAL REALITY KFT, Budapest (HU)

(72) Inventor: Péter Torma, Zsambek (HU)

(73) Assignee: Lateral Reality Kft., Budapest (HU)

( * ) Notice: Subject to any disclaimer, the term of this patent is extended or adjusted under 35 U.S.C. 154(b) by 0 days.

(21) Appl. No.: 16/448,876

(22) Filed: Jun. 21, 2019

(65) Prior Publication Data
    US 2019/0311497 A1    Oct. 10, 2019

Related U.S. Application Data

(63) Continuation of application No. 15/074,677, filed on Mar. 18, 2016, now Pat. No. 10,373,337.

(30) Foreign Application Priority Data

Mar. 7, 2016    (EP) .................................... 16462003

(51) Int. Cl.
    *G06T 7/80*    (2017.01)
    *G06T 7/593*   (2017.01)
    (Continued)

(52) U.S. Cl.
    CPC ................ *G06T 7/85* (2017.01); *G06T 7/593* (2017.01); *G06T 7/60* (2013.01); *G06T 7/70* (2017.01);
    (Continued)

(58) Field of Classification Search
    CPC .. G06T 7/85; G06T 7/70; G06T 7/593; G06T 7/60; G06T 15/08; G06T 2207/10012;
    (Continued)

(56) References Cited

U.S. PATENT DOCUMENTS

| 9,615,081 B2 | 4/2017 | Torma |
| 2013/0044190 A1 | 2/2013 | Hu et al. |
| (Continued) | | |

FOREIGN PATENT DOCUMENTS

| EP | 2866446 A1 | 4/2015 |
| EP | 2866466 A1 | 4/2015 |

OTHER PUBLICATIONS

Delaunoy, et. al., "Two Cameras and a Screen: How to Calibrate Mobile Devices?," 2014 2nd International Conference on 3D Vision, Tokyo, 2014, pp. 123-130 (Year: 2014).*

(Continued)

*Primary Examiner* — Joseph G Ustaris
*Assistant Examiner* — Jill D Sechser
(74) *Attorney, Agent, or Firm* — Flaster Greenberg, P.C.

(57) ABSTRACT

A method is provided for calibrating a stereo imaging system by using at least one camera and a planar mirror. The method involves obtaining at least two images with the camera, each of the images being captured from a different camera position and containing the mirror view of the camera and a mirror view of an object, thereby obtaining multiple views of the object. The method further involves finding the center of the picture of the camera in each of the images, obtaining a relative focal length of the camera, determining an aspect ratio in each of the images, determining the mirror plane equation in the coordinate system of the camera, defining an up-vector in the mirror's plane, selecting a reference point in the mirror's plane, determining the coordinate transformation from the coordinate system of the image capturing camera into the mirror coordinate system, and determining a coordinate transformation.

20 Claims, 9 Drawing Sheets

(51) Int. Cl.
  *H04N 13/211* (2018.01)
  *H04N 13/246* (2018.01)
  *H04N 13/236* (2018.01)
  *H04N 13/282* (2018.01)
  *G06T 7/60* (2017.01)
  *G06T 15/08* (2011.01)
  *G06T 7/70* (2017.01)
  *H04N 13/221* (2018.01)

(52) U.S. Cl.
  CPC ........... *G06T 15/08* (2013.01); *H04N 13/211* (2018.05); *H04N 13/221* (2018.05); *H04N 13/236* (2018.05); *H04N 13/246* (2018.05); *H04N 13/282* (2018.05); *G06T 2207/10012* (2013.01); *G06T 2207/10021* (2013.01); *G06T 2207/10028* (2013.01); *G06T 2207/30244* (2013.01)

(58) Field of Classification Search
  CPC . G06T 2207/30244; G06T 2207/10021; G06T 2207/10028; H04N 13/211; H04N 13/246; H04N 13/236; H04N 13/282
  See application file for complete search history.

(56) References Cited

U.S. PATENT DOCUMENTS

| | | |
|---|---|---|
| 2015/0116463 A1 | 4/2015 | Torma |
| 2016/0140713 A1 | 5/2016 | Martin |
| 2017/0256042 A1 | 9/2017 | Torma |
| 2019/0043221 A1 | 2/2019 | Torma |

OTHER PUBLICATIONS

Kumar, et. al., "Simple calibration of non-overlapping cameras with a mirror," 2008 IEEE Conference on Computer Vision and Pattern Recognition, Anchorage, AK, 2008, pp. 1-7 (Year: 2008).*

Hu, "Its All Done with Mirrors: Calibration-and-Correspondence-Free 3D Reconstruction," 2009 Canadian Conference on Computer and Robot Vision, Kelowna, BC, 2009, pp. 148-154 (Year: 2009).*

Gluckman et al., "Catadioptric Stereo Using Planar Mirrors", International Journal of Computer Vision, vol. 44, No. 1, 2001, pp. 64-79.

Hu et al., "Multiple-view 3-D Reconstruction Using a Mirror", The University of Rochester Computer Science Department Rochester, New York, May 2005, 14 pages.

Yu et al., "Real-Time Camera Pose Estimation Based on Multiple Planar Markers", Fifth International Conference on Image and Graphics, 2009.

Zhang et al., 3D Reconstruction from a Single View of an Object and its Image in a Plane Mirror, Proceedings. Fourteenth International Conference on Pattern Recognition (Cat. No.98EX170), vol. 2, Aug. 16, 1998, pp. 1174-1176.

\* cited by examiner

METHODS AND COMPUTER PROGRAM PRODUCTS FOR CALIBRATING STEREO IMAGING SYSTEMS BY USING A PLANAR MIRROR

CROSS-REFERENCE TO RELATED APPLICATIONS

This application is a continuation of U.S. patent application Ser. No. 15/074,677, filed Mar. 18, 2016, which claims priority from EP Application No. 16462003.1, filed Mar. 7, 2016, the contents of which are hereby incorporated by reference herein.

FIELD OF THE INVENTION

The invention generally relates to the production of calibrated stereo images. More particularly, the present invention relates to methods of producing calibrated stereo images by using a planar mirror and computer program products to carry out the methods.

BACKGROUND OF THE INVENTION

The distance between a camera and a spatial point in a scene can be determined or well estimated from the position of the point within two or more associated images showing the same point, wherein either the scene is stationary or the associated images are captured simultaneously. The distance calculation is still possible if one or more planar mirrors are arranged in the scene, and some of the images are captured in the mirror. The three dimensional (3D) position of a point can be computed from basic geometric relationships when the relationship between the spatial position of the image recording device and the spatial position and specific parameters of the reflecting surfaces (e.g. mirrors) are known. The challenge in computing an unknown distance from multiple images using reflecting surfaces is called catadioptric stereo vision. In J. Gluckman and S. K. Nayar: Catadioptric Stereo Using Planar Mirrors (International Journal on Computer Vision, 44(1), pp. 65-79, August 2001), the basic theory of catadioptric stereo image generation is described in detail. In this paper an image capturing setup including one camera and one planar mirror is introduced with a known relative position of the camera and the mirror, and hence calibration is not needed This method results in a volumetric 3D representation of an object in the real cameras view.

In the paper of Hu et al. 'Multiple-view 3-D Reconstruction Using a Mirror' (ftp://ftp.cs.rochester.edu/pub/papers/robotics/05.tr863.Multiple-view_3-d_reconstruction_using_a_mirror.pdf) a stationary camera and a planar mirror are used for multiple-view three dimensional object reconstruction. The distance between the mirror and the camera is obtained by a single object point and a pair of points of the mirrored view of the object. The mirror image of the camera is searched in the captured images and then the epipoles of the virtual camera are used to determine the spatial relationship between the virtual camera and the real camera. This method, however, cannot be used for 3D object reconstruction if the real object is not visible in the captured images.

The paper of Kumar et al., 'Simple calibration of non-overlapping cameras with a mirror' (http://frahm.web.unc.edu/files/2014/01/Simple-Calibration-of-Non-overlapping-Cameras-with-a-Mirror.pdf), introduces a calibration method for set of cameras. Although this method also uses the mirror images of the cameras, it does not use the images of the real object, and therefore at least five images are required in order to recover the real camera position and orientation.

Calibrating a stereo (or multi-view) camera system is a difficult task. In general, it requires to find several corresponding points in the captured images, and then to solve a non-linear optimization problem with six to eight parameters (depending on whether or not the focal lengths of the cameras are known). In our proposed method, calibration can be obtained by reducing the aforementioned optimization problem to two independent, much simpler optimization problems, each having three or four parameters (depending on whether or not the focal lengths are known). Due to this decomposition of a more complex computation into two simpler computations, the method of the invention is faster, more reliable and more robust than the prior art calibration methods.

The key idea of the calibration methods of the present invention is that by using the mirror view of the real camera along with multiple (different) views of an object in one or more captured images, the 3D coordinates of a point in the real space with respect to the mirror coordinate system can be easily determined. Additionally, by selecting two spatial points which both appear in the one or more captured images, the real distance between the two points can be determined on the basis of their corresponding image points.

SUMMARY OF THE INVENTION

In a first aspect of the present invention, it is provided a method for calibrating a stereo imaging system by using at least one camera and a planar mirror, the method comprising the steps of:
  obtaining at least two images by means of said at least one camera, each of the images being captured from a different camera position and containing the pictures of a mirror view of the image capturing camera and a mirror view of an object, thereby obtaining multiple views of the object,
  finding the center of the picture of the image capturing camera in each of the images,
  obtaining a relative focal length of the at least one camera,
  determining an aspect ratio in each of the images from a distance between two points of the picture of the mirror view of the camera device belonging to the image capturing camera and a distance between the corresponding points of the real camera device belonging to the same image capturing camera,
  determining the mirror plane equation in the coordinate system of the at least one camera by using the aspect ratio and the relative focal length of the camera,
  defining an up-vector in the mirror's plane,
  selecting a reference point in the mirror's plane as the origo of the mirror coordinate system,
  for each image, separately determining the coordinate transformation from the coordinate system of the image capturing camera into the mirror coordinate system, and
  for any pair of images, determining the coordinate transformation from the coordinate system of the camera capturing one image of said image pair into the coordinate system of the camera capturing the other image of said image pair.

The up-vector may be obtained by projecting a gravity vector on the mirror's plane or by selecting corresponding point pairs in the at least one image.

In a second aspect of the present invention, it is provided a method for calibrating a stereo imaging system by using one camera and a planar mirror, the method comprising the steps of:
  obtaining one image captured by the camera, said image containing the pictures of a real view and a mirror view of the object and a mirror view of the image capturing camera, thereby obtaining multiple views of the object,
  finding the center of the picture of the image capturing camera in the image,
  obtaining a relative focal length of the camera,
  determining an aspect ratio in the image from a distance between two points of the picture of the mirror view of the camera device and a distance between the corresponding points of the real camera device,
  determining the mirror plane equation in the coordinate system of the camera by using the aspect ratio and the relative focal length of the camera,
  determining the real coordinates of the epipole of the image,
  determining the coordinate transformation from the coordinate system of the image capturing camera into an arbitrary mirror coordinate system having an origo in the mirror's plane and a z-axis parallel to a normal vector of the mirror's plane.

In a particularly preferred embodiment of the above methods, the camera is part of a camera device including any one of a mobile phone, a smart phone, a phablet, a tablet computer, a notebook, a digital camera or the like.

In a third aspect of the invention, it is provided a method of measuring a distance between two points of an object, wherein the method comprises the steps of:
  capturing at least one image with multiple views of said object by means of a camera-mirror setup including at least one camera and a planar mirror,
  calibrating said camera-mirror setup through the steps of the method according to any one of the first and second aspect of the invention,
  finding an associated point pair in an image view of the object in one of the at least one captured image, and
  calculating the real distance between the two selected points of the object on the basis of acquiring real 3D points from corresponding pixel pairs using the epipolar geometry.

In a fourth aspect of the invention, it is provided a method of depth estimation for an object, wherein the method comprises the steps of:
  capturing at least one image with multiple views of said object by means of a camera-mirror setup including at least one camera and a planar mirror,
  calibrating said camera-mirror setup through the steps of the method according to any one of the first and second aspect of the invention, and
  generating a depth image of the object from the at least one captured image.

In a fifth aspect of the invention, it is provided a computer program product, which includes computer-readable instructions that, when running on a computer, carry out the steps of the method according to the first aspect of the present invention.

In a sixth aspect of the invention, it is provided a computer program product, which includes computer-readable instructions that, when running on a computer, carry out the steps of the method according to the second aspect of the present invention.

BRIEF DESCRIPTION OF THE DRAWINGS

The invention will now be described in detail through preferred embodiments with reference to the accompanying drawings wherein.

DETAILED DESCRIPTION OF THE INVENTION

Within the context of the present description, the term "image" means the product of image capturing performed by an image recording device, such as an image sensor or a camera, while the term "picture" means a visual representation of an object or person within a captured image. An image may be a still image or a frame of a video sequence (also referred to as video image).

Figure 1:
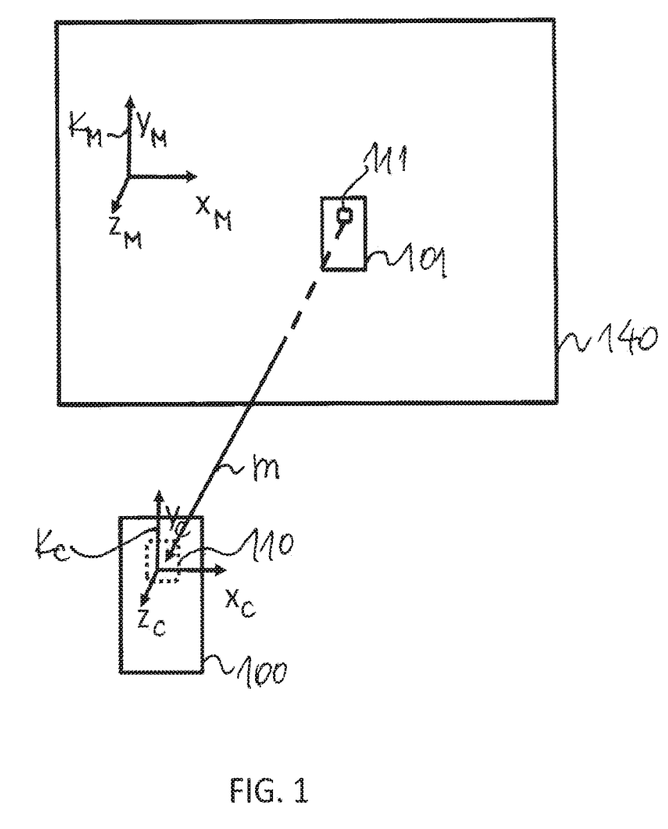
FIG. 1 schematically illustrates the coordinate systems and the geometry of the methods of the present invention.

FIG. 1 illustrates the coordinate systems used in the method of the present invention. A real camera device 100 has a Cartesian coordinate system $K_C$ having mutually orthogonal axes $x_C$, $y_C$ and $z_C$. The real camera device 100 comprises a real camera 110. The real camera device 100 may be any kind of processor-based device equipped with a camera or any sort of image sensor. The camera device 100 may include, for example, a mobile phone, a smart phone, a phablet, a tablet PC, a notebook, a digital camera, or the like, or any kind of other camera device capable for capturing an image.

A planar mirror 140 also has a Cartesian coordinate system $K_M$ having mutually orthogonal axes $x_M$, $y_M$ and $z_M$, wherein axes $x_M$ and $y_M$, and therefore the origo g of the coordinate system $K_M$ are all in the plane of the mirror 140. The real camera device 100 has a mirror view, called a virtual camera device 101 appearing behind the mirror. The virtual camera device 101 also has a virtual camera 111, which is a mirror view of the real camera 110.

A vector m is defined to be perpendicular to the mirror 140 and to have a length which is equal to the distance between the mirror 140 and the real camera 110. One can calculate the vector m using the point of the mirror 140 where the virtual camera 111 appears as it will be described later.

Figure 2:
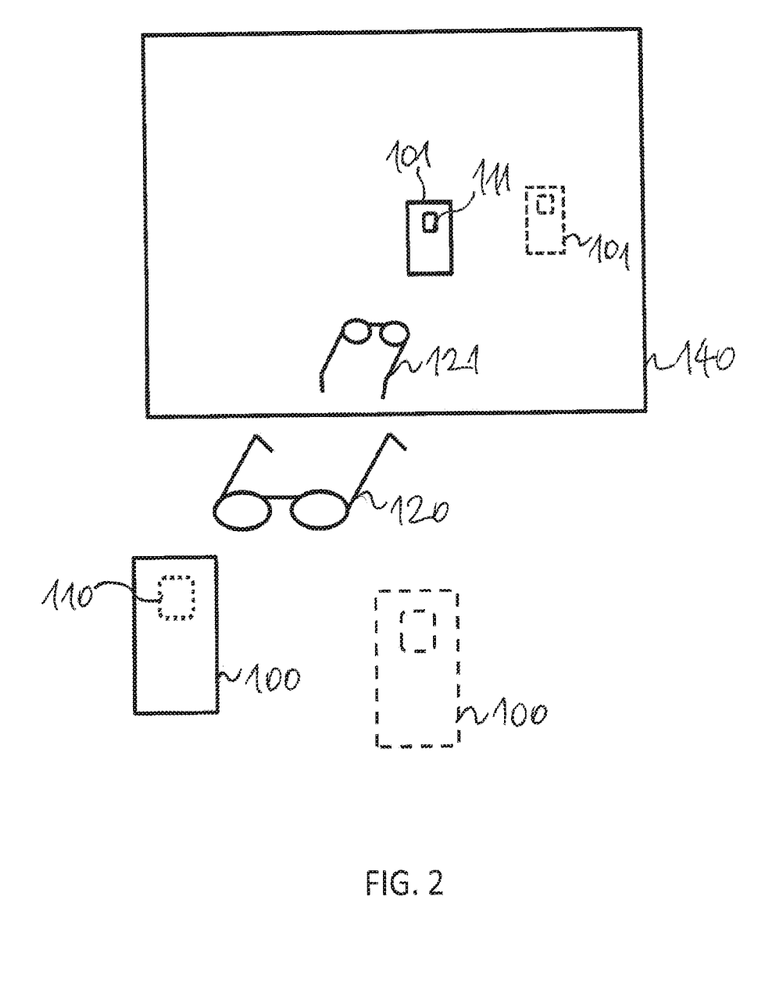
FIG. 2 schematically illustrates the camera-mirror setup according to a first aspect of the present invention.

According to a first aspect of the present invention, calibration is based on the camera-mirror setup shown in FIG. 2. In this setup the real camera 110 captures multiple (at least two) images, each captured image showing only a mirror view (virtual object) 121 of a real object 120 and the virtual camera 111. Although the real object 120 can be within the field of view of the real camera 110 partly or entirely, it has no importance regarding the calibration procedure as only the points of the virtual objects are processed in the method of the invention according to its first aspect. It means that the real object may either be placed in a space volume between the real camera 100 and the mirror 140, or at a location that is farther from the mirror 140 than from the camera 100. In this latter case, the captured images do not contain the views of the real object 120 at all.

It is noted that in FIGS. 1 and 2, the real camera device 100 has its camera 110 on its side facing the mirror 140 therefore the real camera 110 is depicted by dotted line in those Figures.

Figure 3:
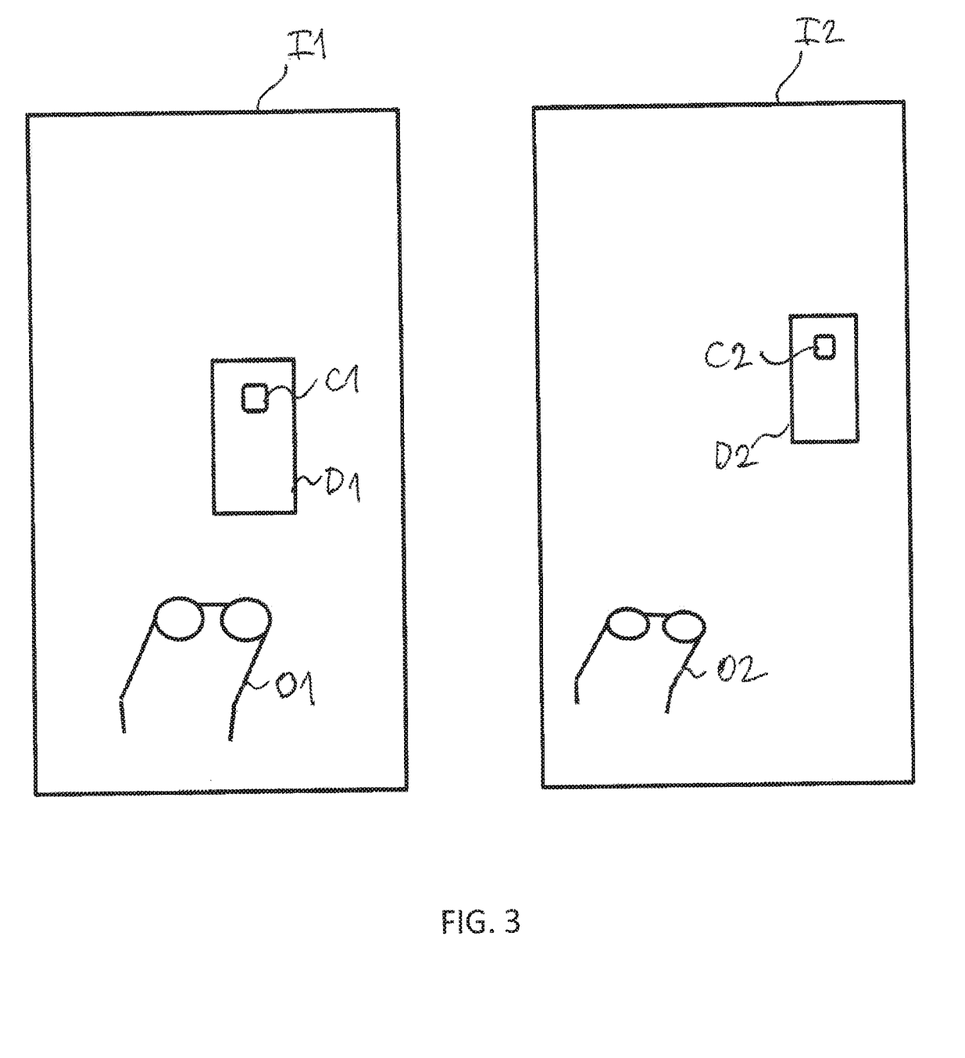
FIG. 3 shows two images captured by a camera at different positions in the camera-mirror setup of FIG. 2.

In FIG. 3, two images I1 and I2 are shown for example, each one being captured at different camera positions. In the images I1 and I2, the virtual camera device has two pictures D1, D2, respectively, at different positions, the virtual camera has two pictures C1, C2, respectively, at different positions, and the mirror view of the object (i.e. the virtual object) has also two pictures O1, O2, respectively, also at different positions. In case more than two images are captured, all of the images are preferably taken at different camera positions, while the relative position between the object and the mirror is assumed to be constant (in case of a stationary arrangement) or Substantially constant (in case of a moving arrangement). If the images I1 and I2 are captured by two cameras simultaneously, the scene does not need to be stationary.

Figure 4:
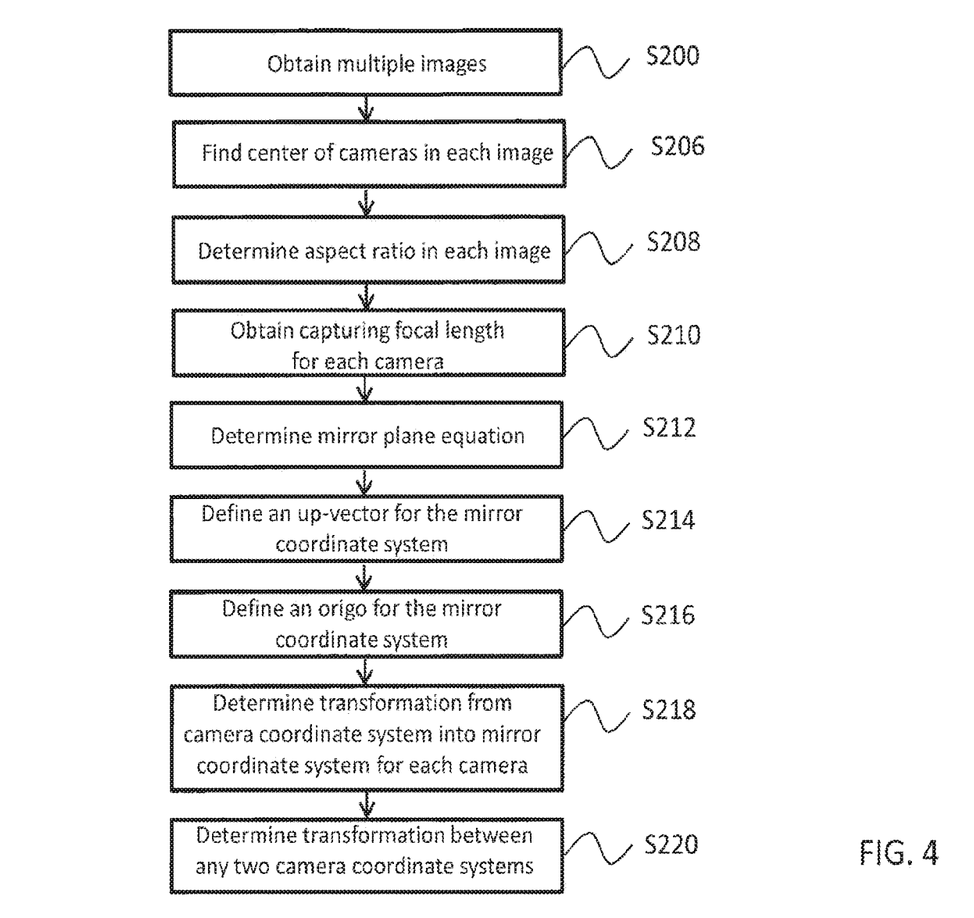
FIG. 4 is a flow diagram of the major steps of the calibration method according to the first aspect of the present invention.

The main steps of the calibration method of the present invention according to its first aspect are shown by the flow diagram of FIG. 4.

In step S200 at least two images are obtained using the aforementioned camera-mirror setup as shown in FIG. 2. Each of the images contains a mirror view of the real camera (i.e. the virtual camera) and a mirror view of an object.

The image processing part of the method has the following four phases:

A) Determining a coordinate transformation $M^*_1$ from a first camera coordinate system $K_{C1}$ to an arbitrary mirror coordinate system $K^*_{M1}$ by using a first image, and determining a coordinate transformation $M^*_2$ from a second camera coordinate system $K_{C2}$ to the another arbitrary mirror coordinate system $K^*_{M2}$ by using a second image. The mirror coordinate systems $K^*_{M1}$ and $K^*_{M2}$ are selected so that their origo locates in the mirror's plane and their z-axis is parallel to a normal vector of the mirror's plane.

B) Using a freely selected global vector, a so called up-vector, that can be detected in relation to all of the initial images, one can define a common y-axis of these mirror coordinate systems $K^*_{M1}$ and $K^*_{M2}$, and hence the transformations $M^{}_1$ and $M^{}_2$ from the first and second camera coordinate systems $K_{C1}$, $K_{C2}$ to the mirror coordinate system $K^{}_{M1}$ and $K^{}_{M2}$, respectively.

C) Determining a global origo g and find the coordinates of this origo g in the mirror coordinate systems $K^{}_{M1}$, and $K^{}_{M2}$, thereby obtaining a specific mirror coordinate system $K_M$, and then determining the coordinate transformations $M_1$ and $M_2$ from the first and second camera coordinate systems $K_{C1}$, $K_{C2}$, respectively, to the common mirror coordinate system $K_M$.

D) Determining a coordinate transformation F from any camera coordinate system $K_{Ck}$ to the first camera coordinate system $K_{C1}$ by determining the coordinate transformation $M_k$ with respect to a further image $I_k$, wherein $F=M_k^{-1}M_1$.

The above phases of the calibration method of the present inventions will be now described in detail with reference to FIG. 4 and also to FIG. 2, which illustrates two captured images as an example. It noted that the images I1 and I2 shown in FIG. 2 may be recorded either the same camera device subsequently, or by different camera device simultaneously. In the latter case the pictures D1 and D2 belong to different camera devices.

Determination of the transformation M*

In order to determine a coordinate transformation from a camera coordination system to an arbitrary mirror coordination system, the center of the pictures C1, C2 of the virtual cameras is first found in each of the images in step S206.

In the calculations we assume that the coordinate transformations have the following general form:

$$M = \begin{pmatrix} R & t \\ 0\ 0\ 0 & 1 \end{pmatrix}$$

where M is a complete homogenous transformation matrix, R is a 3×3 rotation matrix, and t is a 3×1 translation vector.

To calculate the rotation matrix R, first the z-axis of the camera is to be transformed to the normal vector n of the mirror plane. The normal vector is $$n = \frac{m}{\|m\|},$$

wherein m is the vector pointing from the mirror to the camera and orthogonal to the mirror's plane. Consequently, ∥m∥ defines the distance between the mirror and the camera.

The rotation matrix R should transform the y-axis of the camera to the projection of the same global vector to the mirror plane. Hence, it is necessary to define a vector u that is common to all captured images. Based on said vector u, the rotation matrix may be defined as:

$$R = (u \times n\ u\ n)$$

where u×n stands for cross product of the vectors u and n. The projection of the global vector u* onto the mirror's plane will result in an up-vector u of the mirror coordinate system $K_M$.

In the camera coordinate system, the mirror plane can be formulated as:

$$m^T x + \|m\| = 0$$

wherein x is any point of the mirror's plane.

Note that there exist numerous possible transformations M* from the particular camera coordinate system to an arbitrary mirror coordinate system $K^*_M$, since the mirror coordinate system is not completely specified at this stage. The only restrictions for the mirror coordinate system are that the third column of the rotation matrix R in the coordinate transformation M* Should be $$n = \frac{m}{\|m\|}$$

and the translation vector t of the transformation M* should be a vector pointing from the camera's focal point to any point of the mirror's plane, i.e.

$$m^T t + \|m\| = 0$$

In step S210, the distance between the mirror and the camera, i.e. the value of $\|m\|$ is determined by calculating the aspect ratio of the camera in the image. To this end, the capturing focal length f of the camera is to be previously obtained in Step S208.

The focal length f of the camera is either a constant value and thus specified by the manufacturer of the camera or it is set by the user when capturing the images. In both cases, the focal length f of the camera is therefore assumed to be known.

The above mentioned aspect ratio of the camera is defined as the ratio of the distance $d_{u_1,u_2}$ to the distance $d_{U_1,U_2}$, wherein $d_{u_1,u_2}$ is the distance between two points $u_1$, $u_2$ of the real camera device 100 and the $d_{U_1,U_2}$ is the distance between the respective points $U_1$, $U_2$ of the picture of the virtual camera device (e.g. D1 in FIG. 3). The distance $d_{u_1,u_2}$ is measured in the captured image in pixels, whereas the distance $d_{U_1,U_2}$ can be measured on the real camera device physically, for example in millimetre.

Next, a relative focal length H is to be obtained for the calculation of the vector m. To obtain it, let Q be a point in the (either real or virtual) space and let p denote a respective pixel in the captured image. The pixel coordinates $p_x$, $p_y$ of the point p in the image may be defined in the camera coordinate system by the equations:

$$p_x = Q_x \frac{f}{sQ_z} \quad p_y = Q_y \frac{f}{sQ_z}$$

where f is the focal length of the capturing camera and s is the pixel size of the camera. Generally, the pixel size s is a camera-specific parameter given by the manufacturer of the camera. Its value is typically about 1 micron.

For making the following calculations easier, a relative focal length H is defined as the ratio of the focal length f and the pixel size s:

$$H = \frac{f}{s}$$

Accordingly, the mirror's normal vector m can be calculated by the following expression:

$$m = \begin{pmatrix} m_x \\ m_y \\ m_z \end{pmatrix} = \frac{d_{u_1,u_2}}{d_{U_1,U_2}} \begin{pmatrix} c_x \\ c_y \\ H \end{pmatrix}$$

wherein $(c_x, c_y)$ are the coordinates of the center of the picture of the virtual camera in the captured image.

As a result, the mirror plane equation can be obtained in step S212 according to the above mentioned formula:

$$m^T x + \|m\| = 0$$

Determination of the transformation M**

Next, in step S214, an up-vector u is defined for the mirror coordinate system $K_M$ in the following way.

Let u* be any vector in the space. A possible selection for u* may be the gravity vector. Another option may be to select two points in the space with known distance from the mirror's plane. In this latter case one need to be able to find the corresponding pixels in the captured images. In fact it is not necessary to actually know this vector, it is only needed to know (or to calculate) its projection to the mirror plane, which vector is denoted by u. This projected vector u is regarded as the up-vector of the mirror coordinate system. The up-vector allows to define a coordinate transformation M** from the camera coordinate system to the mirror coordinate system in a more determined way, through setting the second column of the rotation matrix R to u. It is noted that at this point the rotation matrix R is entirely defined since the third column is the normalized mirror normal vector and the first column can be acquired from the principle of orthonormality.

Determination of the transformation M

In step S216, the origo of the mirror coordinate system $K^{**}{}_M$ is determined. This can be done in several ways which will be introduced hereinafter.

In a first possible way, the origo of the mirror coordinate system is obtained by means of the free selection of a point in the space. Top this end, it is assumed that there is a point p at a known d distance from the mirror and this point is visible each of the at least one captured images. For example, this point may be selected as a mark on the mirror itself. The origo of the mirror coordinate system is considered to be the projection of this point p to the mirror's plane. Let the image pixel coordinates of the selected point p in the k-th image be $(p_x^k, p_y^k)$, and let its distance from the mirror be d. Let $g^k$ be the base vector of the image ray. This means that the point p referring to $(p_x^k, p_y^k)$ can be written as a multiple of $g^k$, wherein $g^k$ can be written using the pixel coordinates and the relative focal length of the camera:

$$g^k = \begin{pmatrix} p_x^k \\ p_y^k \\ H \end{pmatrix}$$

The 3D real coordinates $p = \mu g^k$ can be easily calculated in the camera coordinate system by rioting that it is the cross point of a multiple of the ray vector and the translation of the mirror plane by d, that is $$m^T x + \|m\| + d = 0.$$

As a result e can be calculated by finding a multiplication factor µ for which:

$$\mu m^T \begin{pmatrix} p_x \\ p_y \\ H_2 \end{pmatrix} + \|m\| + d = 0$$

From the above equation the 3D coordinates of point p in the camera coordinate system is:

$$p = -\frac{\|m\| + d}{m^T g^k} g^k$$

The origo of the mirror coordinate system can be obtained by adding a vector of length d and the direction of the mirror plane normal to p, resulting in the following expression:

$$t = p + d\frac{m}{\|m\|}.$$

A second possible way of determining the origo of the mirror coordinate system is to select an arbitrary point in the mirror plane (e.g. the projection of the focal point of the camera), finding the associated image point in one of the captured images, and then finding a few further corresponding points in at least one other captured image. The origo of the mirror coordinate system can then be calculated by means of an optimization method (e.g. least mean square or the generalized Hough transform). It is noted that in this scheme, more than one associated point pair is needed for the calculations. The optimization problem comes straightforwardly from the above equations. Let us assume that there are some corresponding pixels in the images $(p_{x,i}^k, p_{y,i}^k)$, where i denotes the different points, and k denotes the different images. Then the 3D of the base vector of the image ray $g^k$ of the a pixel point i in an image k is $$g_i^k = \begin{pmatrix} p_{x,i}^k \\ p_{y,i}^k \\ H \end{pmatrix}$$

Figure 9:
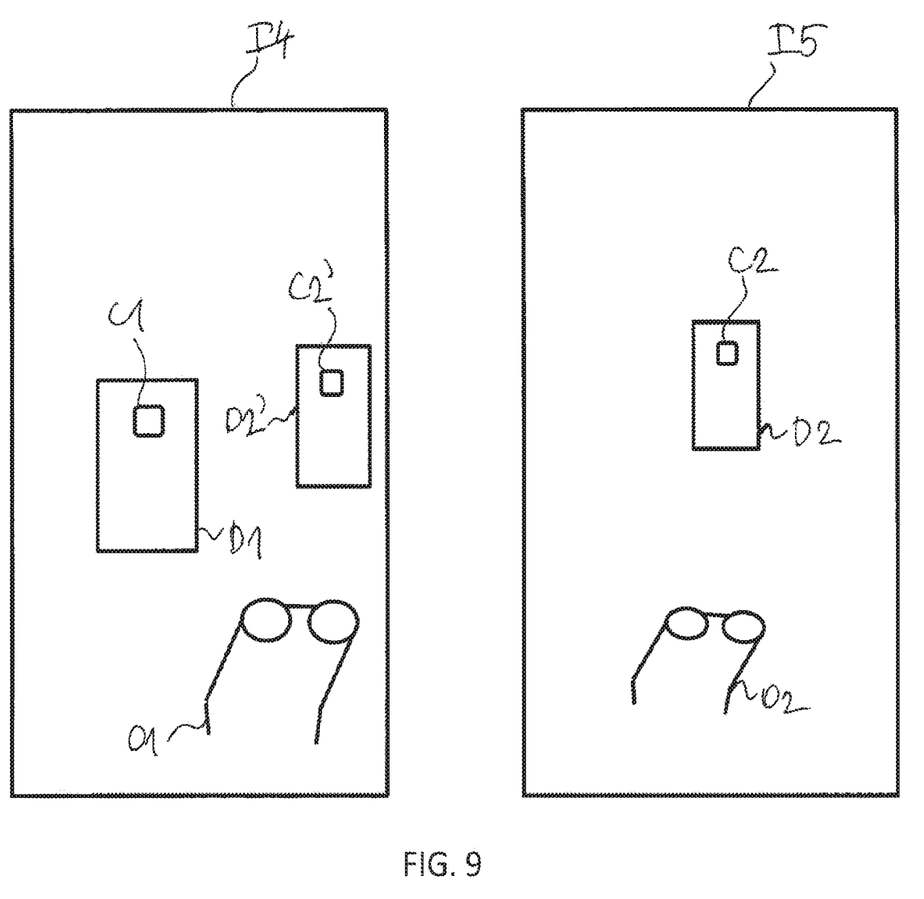
FIG. 9 shows a further pair of exemplary images simultaneously captured by two cameras at different positions in the camera-mirror setup according to the first aspect of the present invention.

It is noted that the distance of these points from the mirror's plane is unknown. Let us denote these distance by $d_k$. This results in the following set of equations:

$$t_k = -\frac{\|m\| + d_k}{m^T g_i^k} g_i^k + d_k \frac{m}{\|m\|}$$

where the coordinates of $t_k$ and $d_k$ are unknown for all points. It is obvious that one corresponding point pair comes with one new unknown $d_k$ and gives a two-dimensional constraint shown above per image pair. As a result, two corresponding point pairs determine the missing translations ($t_k$) to the common origo of the mirror coordinate system, A third possible way of determining the origo of the mirror coordinate system is to capture images I4, I5 by using two camera devices simultaneously in such a way that at least one of the images (without loss of generality let this be image I4) includes the pictures D1, D2' of the mirror views of both camera devices, while the other image (e.g. image I5) includes only the picture D2 of the mirror view of the second camera, as shown in FIG. 9. The images I4, I5 also show the pictures O1, O2 of the mirror view of an object. It is noted that once the mirror plane equation is known in both camera coordinate systems, the real distance between the camera devices and the mirror is also known. Furthermore the projected points of the focal points of the cameras on the images are also known. In the above described scheme the projected focal point of D2 be the common origo. Since the distance of D2 from the mirror and the pixel position of this point in image I4 is known, the translation to the common origo (the projection of D2 to the mirror plane) can be easily calculated for the first image.

Based on the above calculations and considerations, the coordinate transformation from the coordinate system of the image capturing camera into the mirror coordinate system is determined for each image in step S218.

Hence, in step S220, a coordinate transformation between any two camera coordinate systems can be carried out by using the above mentioned fundamental matrix:

$$F_{kn} = M_K^{-1} M_n$$

wherein $M_k$ and $M_n$ are the coordinate transformations from the camera coordinate systems $K_{Ck}$ and $K_{Cn}$, respectively, into the mirror coordinate system $K_M$. The advantage of the above described calibration method is that the coordinate transformation matrices M can be determined for each captured image separately, thus the calculation of the fundamental matrix F requires less computational force than in other known methods.

Figure 5:
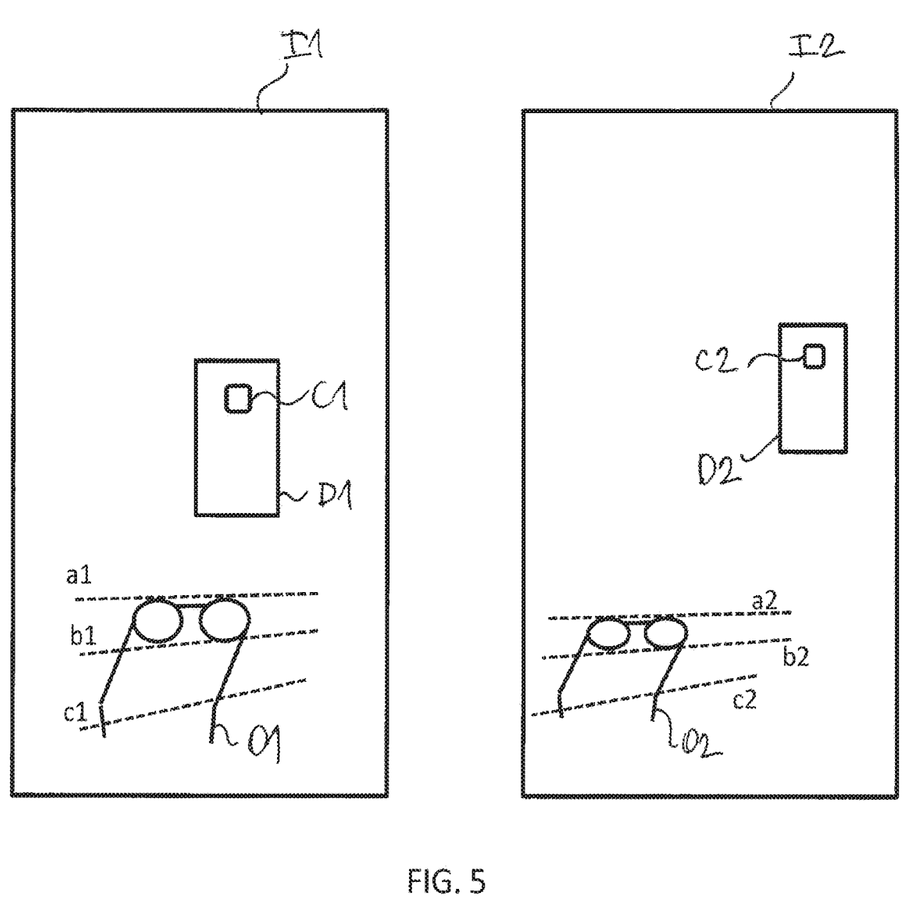
FIG. 5 illustrates the images of FIG. 3 with epipolar lines.

The fundamental matrix F can be visualized by epipolar lines as shown in FIG. 5, in which the dashed lines of images I1 and I2 with the same letter are mutually corresponding epipolar lines. Accordingly, the corresponding epipolar line pairs in image I1 and image I2 are lines a1 and a2, respectively; lines b1 and b2, respectively; and lines c1 and c2, respectively. It means that any point in one of the images I1, I2 should belong to a real 3D point that has its picture on the other one of the images I1, I2 along the corresponding epipolar line (assuming that the mentioned point is not masked in the other images).

In a second aspect of the present invention, the multiple views of the object is included within one image, wherein one of the views of the object is the picture of the real object and the other view of the object is its mirror view. The image shall also contain the mirror view of the capturing camera.

Figure 6:
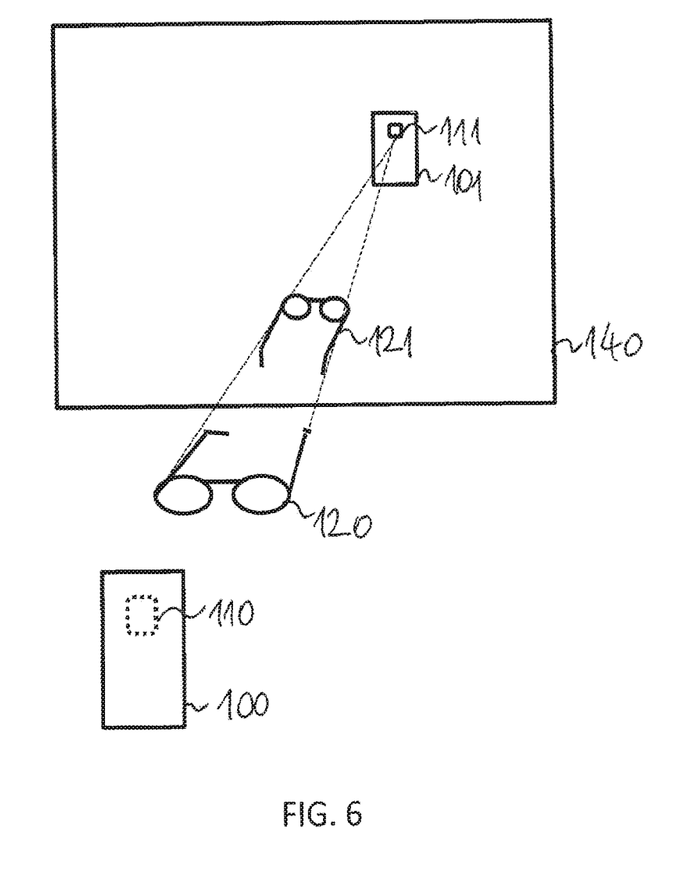
FIG. 6 schematically illustrates the camera-mirror setup according to a second aspect of the present invention.

According to the second aspect of the present invention, calibration is based on the camera-mirror setup shown in FIG. 6. In this setup the real camera 110 captures both of the view and the mirror view of an object 120. The mirror view of the capturing camera device 100 with its camera 110 (i.e. the virtual camera device 101 with its virtual camera 111) is also appearing in the mirror 140. In this case, the real object 120 shall be within the field of view of the real camera 110 at least partly.

It is noted that in FIG. 6, the real camera device 100 has its camera 110 on its side facing the mirror 140 therefore the real camera 110 is depicted by dotted line.

Figure 7:
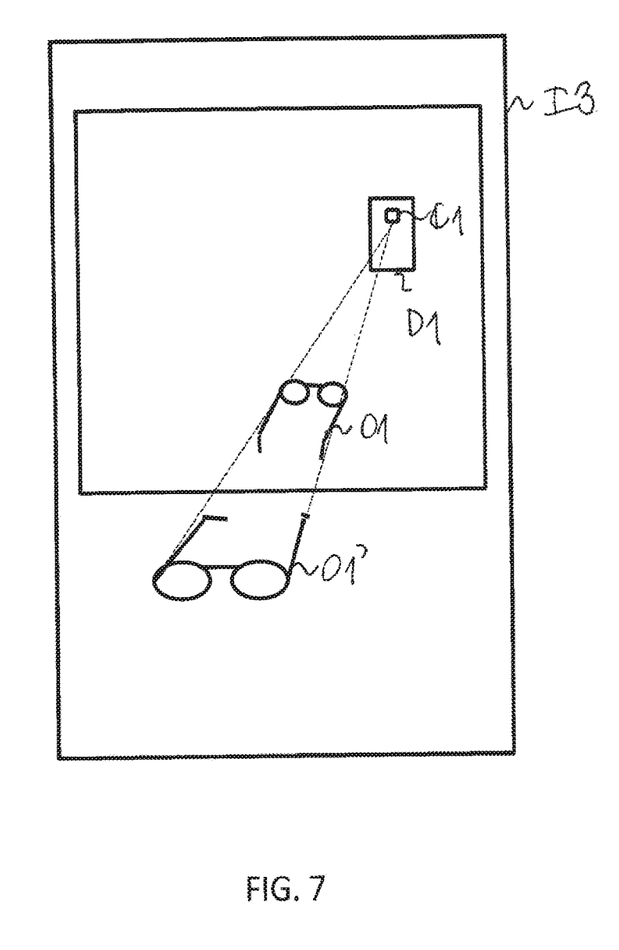
FIG. 7 shows an image captured by the camera in the camera-mirror setup of FIG. 6.

In FIG. 7, an image I3 captured in the camera-mirror setup of FIG. 6 is shown for example. In the image I3, the virtual camera device has a pictures D1, the virtual camera has a picture C1, and the real object and the mirror view of the object (i.e. the virtual object) have two pictures O1, O1', respectively, at different positions within the image I3.

Figure 8:
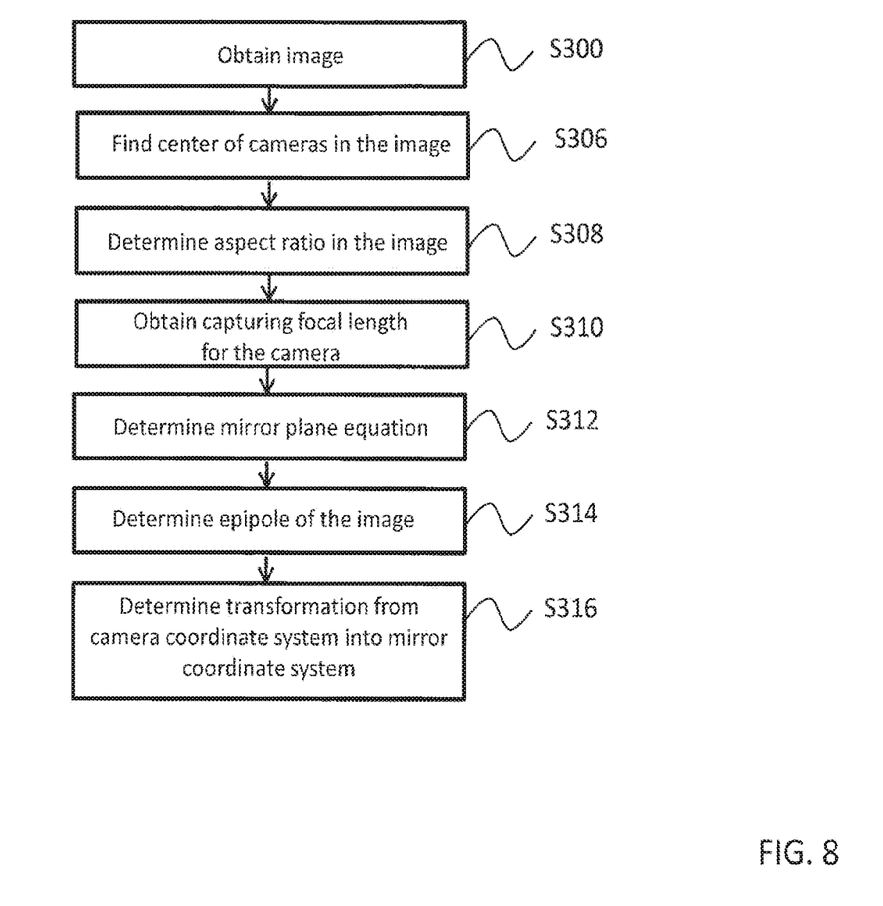
FIG. 8 is a flow diagram of the major steps of the calibration method according to the second aspect of the present invention.

The main steps of the calibration method of the present invention according to its second aspect is shown by the flow diagram of FIG. 8.

In step S300 one image is obtained using the aforementioned camera-mirror setup as shown in FIG. 6. The captured image contains a picture of the mirror view of the real camera (i.e. the virtual camera), as well as pictures of the real view and the mirror view of an object.

The image processing part of the method according to the second aspect of the present invention requires the only image processing phase of:

A) Determining a coordinate transformation M* from the camera coordinate system $K_C$ to an arbitrary mirror coordinate system $K^*_M$ by using the image. The mirror coordinate system $K^*_M$ is selected so that its origo locates in the mirror's plane and its z-axis is parallel to a normal vector of the mirror's plane.

It is noted that in this aspect of the present invention, an arbitrary mirror coordinate system is enough for the calibration of the camera-mirror setup shown in FIG. 6 since only one image (i.e. image I3) is captured and consequently, it is not needed to determine a specific mirror coordinate system, which in the first aspect of the present invention was used to determine the coordinate transformations between the different camera coordinate systems.

The above phase A) of the image processing is carried out in the same way as in the first aspect, with the difference that only one coordinate transformation is determined between the camera coordinate system and the mirror coordinate system (which may have its origo anywhere in the mirror's plane and its up-vector extending in any direction within the mirror's plane). Accordingly, steps S306 to S312 correspond to steps S206 to S212 of the first method, respectively. In particular, in step S306, the center of the picture C1 of the virtual camera is found in the image, then in step S308 the capturing focal length f of the camera is obtained, followed by the step S310, in which the distance between the mirror and the camera, i.e. the value of $\|m\|$, is determined by calculating the aspect ratio of the camera in the image. As a result, the mirror plane equation is obtained in step S312 on the basis of the captured image.

In this case the center of the picture C1 of the virtual camera is an epipole E of the stereo system defined by the real and virtual views of the object. This means that a line v that connects the epipole E with any point V1 of the picture O1 of the real object in the image I3 also contains the corresponding point V2 of the picture O2 of the virtual object. By finding these points V1, V2 in the image I3, the position of the point in the real three dimensional space can be determined in step S314. In this regard let us assume that the pixel coordinates of a point and the mirror view of that point (i.e. the virtual point) are both known, while only the distance between said point and the mirror is unknown. In this case there are two specific constraints, namely:
1. The distance between the point and the mirror's plane equals to the distance between the virtual point and the mirror.
2. The vector that connects the real point and the virtual point is perpendicular to the mirror's plane (and therefore it is also parallel to the normal vector of the mirror's plane).

From the above two conditions the distance between the point and the mirror can be simply calculated as described below.

Let $(u_x, u_y)$ be the coordinates of the picture u of a real point p in a captured image and $(v_x, v_y)$ be the coordinates of the picture v of the mirror view q of the point p within the same image. Once the distance c between the point p and the mirror is determined, the 3D coordinates of the real point p in the camera coordinate system can be easily calculated using the equations as described above.

Let $\mu_1$ and $\mu_2$ be selected in a way that $$p = \mu_1 \begin{pmatrix} u_x \\ u_y \\ H_2 \end{pmatrix} = \mu_1 p_0 \text{ and } q = \mu_2 \begin{pmatrix} v \\ v_y \\ H_2 \end{pmatrix} = \mu_2 q_0.$$

Clearly, $m^T p + d = c$ and $m^T q + d = -c$.
Hence, $$\mu_1 = \frac{c-d}{m^T p_0} \text{ and } \mu_2 = \frac{-c-d}{m^T q_0}.$$

Furthermore it is known that the differential vector p−q is parallel to the vector m, hence $p-q=\tau m$. Substituting $\mu_1$ and $\mu_2$ leads to a simple linear equation system for c and $\tau$. By solving the equation system, the 3D coordinates of the point p can be calculated.

Based on the above calculations and considerations, the coordinate transformation from the coordinate system of the image capturing camera into an arbitrary mirror coordinate system having an origo in the mirror's plane and a z-axis parallel to a normal vector of the mirror's plane can be determined in step S316.

Upon calculating the positions of further associated point pairs in the image, the distances between these points in the real 3D space can be calculated.

The methods of the invention allow to determine real 3D coordinates of points which appear in any one of the at least one captured image. Thus the methods of the invention can be further used, for example, to measure the distance between two points of an object, which are visible in at least two different views in the at least one captured image. The different views of the object may include, for example, two different mirror views in two captured images (cf. first aspect of the invention), or a real view and a mirror view of the object within one image (cf. second aspect of the invention).

Accordingly, in a third aspect of the invention, it is provided a method of measuring a distance between two points of an object, wherein the method comprises the steps of:
  capturing at least one image with multiple views of said object by means of a camera-mirror setup including at least one camera and a planar mirror,
  calibrating said camera-mirror Setup through the steps of the method according to the first any one of the first and second aspects of the invention,
  finding an associated point pair in an image view of the object in one of the at least one captured image, and
  calculating the real distance between the two selected points of the object on the basis of acquiring real 3D points from corresponding pixel pairs using the epipolar geometry.

Once a stereo imaging system described above is calibrated by means of the above steps, a depth estimation for a captured object may be performed to generate a depth image of the object. Furthermore, once the stereo imaging system of the invention is calibrated through the above steps, the measurement of any kind of distances between two points becomes possible by finding associated point pairs in the at least one captured image.

Accordingly, in a fourth aspect of the invention, it is provided a method of depth estimation for an object, wherein the method comprises the steps of:
  capturing at least one image with multiple views of said object by means of a camera-mirror setup including at least one camera and a planar mirror,
  calibrating said camera-mirror setup through the steps of the method of any one of the first and second aspects of the invention, and
  generating a depth image of the object from the at least one captured image.

In a fifth aspect, the present invention also relates to a computer program product, which includes computer-readable instructions that, when running on a computer, carry out the above steps of the method according to the first aspect of the present invention.

In a sixth aspect, the present invention also relates to a computer program product, which includes computer-readable instructions that, when running on a computer, carry out the above steps of the method according to the second aspect of the present invention.

The invention claimed is:

1. A non-transitory computer program product, which includes computer-readable instructions that, when running on a computer, carry out a method comprising:
   obtaining a first image, the first image comprising a first mirror view of a camera;
   obtaining a second image, the second image comprising a second mirror view of the camera;
   determining a center of the first mirror view of the camera;
   determining a center of the second mirror view of the camera;
   determining an aspect ratio associated with the first image;
   determining an aspect ratio associated with the second image;
   generating a first coordinate transformation between a first camera coordinate system associated with the first image and a mirror coordinate system based on at least the center of the first mirror view of the camera and the aspect ratio associated with the first image;
   generating a second coordinate transformation between a second camera coordinate system associated with the second image and the mirror coordinate system based on at least the center of the second mirror view of the camera and the aspect ratio associated with the second image;
   determining a mirror coordinate system based on the first and second coordinate transformations; and
   determine at least one measurement associated with an object comprised in at least one of the first image or the second image using the determined mirror coordinate system.

2. The non-transitory computer program product of claim 1, wherein the at least one measurement comprises a depth measurement of the object relative to a mirror.

3. The non-transitory computer program product of claim 1, wherein the at least one measurement comprises a measurement of a length between two points comprised on the object.

4. The non-transitory computer program product of claim 1, wherein the aspect ratio associated with the first image and the aspect ratio associated with the second image are determined based at least on a relative focal length defined for the camera.

5. The non-transitory computer program product of claim 4, wherein the relative focal length comprises a ratio of a focal length for the camera and a pixel size for the camera.

6. A method comprising:
   obtaining a first image, the first image comprising a first mirror view of a camera;
   obtaining a second image, the second image comprising a second mirror view of the camera;
   determining a center of the first mirror view of the camera;
   determining a center of the second mirror view of the camera;
   determining an aspect ratio associated with the first image;
   determining an aspect ratio associated with the second image;
   generating a first coordinate transformation between a first camera coordinate system associated with the first image and a mirror coordinate system based on at least the center of the first mirror view of the camera and the aspect ratio associated with the first image;
   generating a second coordinate transformation between a second camera coordinate system associated with the second image and the mirror coordinate system based on at least the center of the second mirror view of the camera and the aspect ratio associated with the second image; and
   determining a mirror coordinate system based on the first and second coordinate transformations.

7. The method of claim 6, wherein the aspect ratio associated with the first image and the aspect ratio associated with the second image are determined based at least on a relative focal length defined for the camera.

8. The method of claim 7, wherein the relative focal length comprises a ratio of a focal length for the camera and a pixel size for the camera.

9. The method of claim 6, wherein at least one of the first image or the second image further comprises a first mirror view of a first point and a first mirror view of a second point.

10. The method of claim 9, wherein the method further comprises determining a distance between the first point and the second point using the determined mirror coordinate system.

11. The method of claim 6, wherein at least one of the first image or the second image further comprises a first mirror view of a first point.

12. The method of claim 11, wherein the method further comprises determining a depth of the first point from a mirror using the determined mirror coordinate system.

13. A non-transitory computer program product, which includes computer-readable instructions that, when running on a computer, carry out a method comprising:
   obtaining a first image, the first image comprising a first mirror view of a camera;
   obtaining a second image, the second image comprising a second mirror view of the camera;
   determining a center of the first mirror view of the camera;
   determining a center of the second mirror view of the camera;
   determining an aspect ratio associated with the first image;
   determining an aspect ratio associated with the second image;
   generating a first coordinate transformation between a first camera coordinate system associated with the first image and a mirror coordinate system based on at least the center of the first mirror view of the camera and the aspect ratio associated with the first image;
   generating a second coordinate transformation between a second camera coordinate system associated with the second image and the mirror coordinate system based on at least the center of the second mirror view of the camera and the aspect ratio associated with the second image; and
   determining a mirror coordinate system based on the first and second coordinate transformations.

14. The non-transitory computer program product of claim 13, wherein the aspect ratio associated with the first image and the aspect ratio associated with the second image are determined based at least on a relative focal length defined for the camera.

15. The non-transitory computer program product of claim 14, wherein the relative focal length comprises a ratio of a focal length for the camera and a pixel size for the camera.

16. The non-transitory computer program product of claim 13, wherein at least one of the first image or the second image further comprises a first mirror view of a first point and a first mirror view of a second point.

17. The non-transitory computer program product of claim 16, wherein the method further comprises determining a distance between the first point and the second point using the determined mirror coordinate system.

18. The non-transitory computer program product of claim 13, wherein at least one of the first image or the second image further comprises a first mirror view of a first point.

19. The non-transitory computer program product of claim 18, wherein the method further comprises determining a depth of the first point from a mirror using the determined mirror coordinate system.

20. The non-transitory computer program product of claim 13, further comprising calibrating a stereo imaging system using the mirror coordinate system.

\* \* \* \* \*